United States Patent [19]
Stewart et al.

[11] Patent Number: 5,239,635
[45] Date of Patent: Aug. 24, 1993

[54] VIRTUAL ADDRESS TO PHYSICAL ADDRESS TRANSLATION USING PAGE TABLES IN VIRTUAL MEMORY

[75] Inventors: Robert E. Stewart, Stow; Timothy E. Leonard, Groton; Sherry T. Lee, Carlisle, all of Mass.

[73] Assignee: Digital Equipment Corporation, Maynard, Mass.

[21] Appl. No.: 807,950

[22] Filed: Dec. 10, 1991

Related U.S. Application Data

[63] Continuation of Ser. No. 202,886, Jun. 6, 1988.

[51] Int. Cl.⁵ .............................................. G06F 12/08
[52] U.S. Cl. .................................................... 395/400
[58] Field of Search ................................. 364/200, 900

[56] References Cited

U.S. PATENT DOCUMENTS

| | | | |
|---|---|---|---|
| 3,829,840 | 8/1974 | Burk et al. | 364/200 |
| 4,084,230 | 4/1978 | Matick | 364/200 |
| 4,376,297 | 3/1983 | Anderson et al. | 364/200 |
| 4,481,573 | 11/1984 | Fukunaga et al. | 364/200 |
| 4,482,952 | 11/1984 | Akagi | 364/200 |
| 4,587,610 | 5/1986 | Rodman | 364/200 |
| 4,616,311 | 10/1986 | Sato | 364/200 |
| 4,628,451 | 12/1986 | Sawada et al. | 364/200 |
| 4,638,426 | 1/1987 | Chang et al. | 364/200 |
| 4,731,740 | 3/1988 | Eguchi | 364/200 |
| 4,774,653 | 9/1988 | James | 364/200 |
| 4,774,659 | 9/1988 | Smith et al. | 364/200 |
| 4,800,489 | 1/1989 | Moyer et al. | 364/200 |
| 4,802,084 | 1/1989 | Ikegaya et al. | 364/200 |
| 4,811,206 | 3/1989 | Johnson | 364/200 |
| 4,812,969 | 3/1989 | Takagi | 364/200 |
| 4,821,171 | 4/1989 | Calamari | 364/200 |
| 4,849,876 | 7/1989 | Ozawa et al. | 364/200 |
| 4,885,680 | 12/1989 | Anthony et al. | 364/200 |
| 4,972,338 | 11/1990 | Crawford et al. | 364/200 |
| 4,985,828 | 1/1991 | Shimuzu et al. | 364/200 |
| 5,008,811 | 4/1991 | Scalzi et al. | 364/200 |

FOREIGN PATENT DOCUMENTS

WOA8802148 3/1988 PCT Int'l Appl. .

OTHER PUBLICATIONS

IBM Technical Disclosure Bulletin, "Segmented Virtual to Reel Translation Assist", vol. 27, No. 2, Jul. 1984.

B. Furht, et al., Computer, "A Survey of Microprocessor Architectures for Memory Management", vol. 20, No. 3, Mar. 1987.

*Primary Examiner*—Dale M. Shaw
*Assistant Examiner*—C. Shin
*Attorney, Agent, or Firm*—Kenyon & Kenyon

[57] ABSTRACT

A method for translating a virtual address into a physical address, in which page tables used in the translation process are referenced by virtual addresses. Typically, a translation mechanism includes a translation buffer that, given a virtual address, can sometimes provide the corresponding physical address. A translation-buffer miss is said to occur when the translation buffer is presented with an address for which it can not provide the translation. When such a miss occurs, the translation mechanism obtains the translation by reading the page tables. When the translation mechanism attempts to read the page tables from virtual memory, a second-order miss can occur. The difficulty of infinite recursion of misses is avoided by handling second-order misses differently from first-order misses. When a second-order miss occurs, the translation mechanism uses a prototype page table entry and the virtual address of the page table entry to produce a physical address without using the page tables. Since consecutive pages of the page table in virtual memory reside in consecutive page frames in physical memory, a virtual address in the page tables can be translated to a physical address by adding the page frame number from the prototype page table entry to the virtual page number in the virtual address. The prototype page table entry contains a page-frame number that is equal to the page-frame number of the first page of the page table minus the virtual-page number of the first page of the page table.

11 Claims, 7 Drawing Sheets

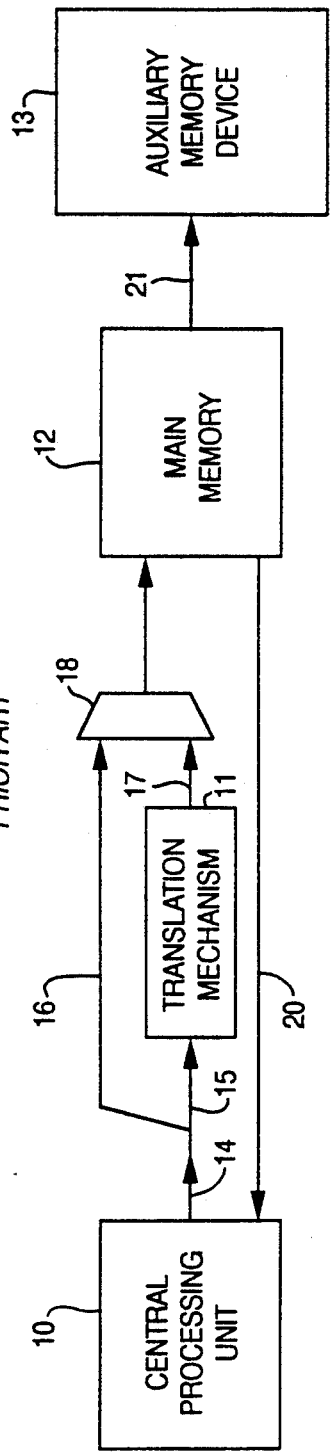
FIG. 1 *PRIOR ART*
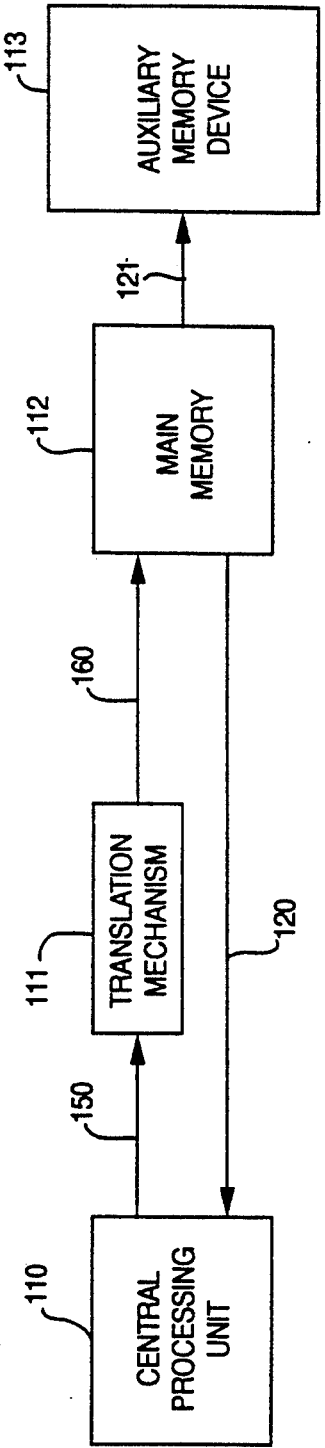
FIG. 2

TB

| V | VPN (from VA) | PFN (from PTEs) |
|---|---|---|
| ✓ | | |
| ✓ | | |
| ✓ | | |
| ✓ | | |
| ✓ | | |
| ✓ | | |

PA

VIRTUAL ADDRESS TO PHYSICAL ADDRESS TRANSLATION USING PAGE TABLES IN VIRTUAL MEMORY

This application is a continuation of application Ser. No. 07/202,886, filed Jun. 6, 1988.

FIELD OF THE INVENTION

The invention is directed to a computer system and, more particularly, to a computer system architecture including a virtual memory space and a virtual-address to physical-address translation mechanism which operates entirely on the basis of virtual address information and which, therefore, never requires generation of a physical address by a central processing unit of the computer system.

BACKGROUND OF THE INVENTION

Many modern computer systems include a virtual address space and a physical address space. Furthermore, a translation scheme is provided to translate a virtual address to a physical address such that data referenced by a virtual address and residing in the physical memory may be fetched by translating the virtual address into a corresponding physical address. For example, the virtual memory space can be based upon the concept that the computer system has a single, large memory space equal to the total capacity of the auxiliary memory of the computer system. All application programs to be processed by the computer system are constructed with reference to the virtual memory space by use of virtual addresses which define the location of instructions and data required by the program within the virtual memory space. When a particular application program is being executed by the central processing unit or units of the computer system, the data and instructions related to the program are transferred from the auxiliary memory devices of the system, as for example, from magnetic disks, and into the main physical memory of the system. The computer system is provided with a mechanism to dynamically translate the virtual addresses generated by the program being executed into correct main memory locations, each defined by a unique physical address.

During the execution of the program, the central processing unit continues to reference data and instructions by virtual addresses and a translation mechanism must be coupled between the central processing unit and the main physical memory to continuously translate the virtual addresses produced by the central processing unit into the corresponding physical addresses where the data or instructions may be found in the main physical memory. Typically, the virtual memory space is divided into memory units called pages. A page contains a predetermined number of basic addressable units. For example, the basic addressable unit may an 8-bit byte and a page may contain 512 bytes. The format for a virtual address to uniquely identify a basic addressable unit would be the virtual page number containing the addressable unit and the byte number of the addressable unit within the specified page.

A page table is maintained in the physical memory to cross reference virtual addresses to physical addresses. As the computer system dynamically transfers data to and from auxiliary memory devices, it generates page frame numbers which define 512 byte pages of physical memory, to be used on references to the virtual addresses. A page table entry is provided for each virtual page then residing in physical memory. The page frame number assigned to a particular virtual page at the time of a transfer of the related data from auxiliary memory to main memory is stored in the page table entry for that virtual page.

Accordingly, in concept, a physical address corresponding to a particular virtual address can be obtained by fetching the page table entry for the virtual page of that virtual address from physical memory and merging the byte number of the addressable unit of data with the page frame number contained in the page table entry. However, in practice, the central processing unit maintains a translation buffer that is a special purpose cache of recently used page table entries. Most often, the translation buffer already contains the page table entries for the virtual addresses being used by a program and the processor need not go to physical memory to obtain them.

In known computer systems, the translation buffer is in a translation mechanism that is coupled on a timing-critical data path between the central processing unit and the main memory. The translation mechanism ascertains the page frame number for the virtual page number of the virtual address to be translated from the translation buffer and attaches the byte number of the virtual address to the page frame number listed in the translation buffer to provide the physical address. The output of the translation mechanism is typically coupled to one input of a multiplexer. The other input of the multiplexer is coupled directly to the central processing unit to provide a bypass line around the translation mechanism. The output of the multiplexer is then coupled to the main memory. In this manner, either a physical address determined by the translation mechanism or an address directly generated by the central processing unit can be transmitted to the main memory.

As indicated above, most virtual to physical address translations are performed through use of the translation buffer. However, if there is a miss, i.e., the translation buffer does not contain a virtual page number entry for the virtual address to be translated, then the page table entry for the virtual address to be translated must be fetched from physical memory to load the translation buffer. In the heretofore known computer systems, the physical base address of the page table is held in a register. The processor executes a translation algorithm utilizing the physical base address stored in the register and the virtual page number of the virtual address to be translated to calculate the physical address of the page table entry needed for the translation. This enables the processor to directly fetch the page table entry via the translation mechanism bypass line. The page frame number of the page table entry is then loaded into the translation buffer by the central processing unit as an entry corresponding to the virtual page number of the original virtual address to be translated. The translation mechanism can then complete the translation by attaching the byte number of the virtual address to the page frame number loaded into the translation buffer by the central processing unit.

SUMMARY OF THE INVENTION

It is a primary objective of the present invention to provide a translation mechanism which is operable to translate all virtual addresses to physical addresses by utilizing the virtual addresses of the page table entries. As the operating system of the computer system dynamically transfers data from auxiliary to main memory, it generates a physical address and a virtual address for each page table entry. However, inasmuch as the page table entries actually reside in physical main memory, a physical address is required to fetch each page table entry. As discussed above, the heretofore known systems utilize the central processing unit to generate the physical address of the page table entry, directly fetch the page table entry through the bypass line and then load the translation buffer with the page frame number needed to complete the translation.

The fundamental concept of the present invention is based upon a method by which a translation mechanism is operable to translate a few virtual addresses, i.e., virtual addresses of page table entries, without the use of the page table. This is achieved by providing a page table entry prototype containing a page frame number representing an offset between the physical address and the virtual address of any particular page table entry. The prototype is based upon the contiguous memory space of each of the virtual and physical memory spaces. More specifically, consecutive pages of the page table in virtual memory reside in consecutive page frames in physical memory. Accordingly, the page frame number of the page table entry prototype is equal to the page frame number of the first page of the page table minus the virtual page number of the first page of the page table. The page frame number of the page table entry prototype is, therefore, a fixed offset which may be added to the virtual page number of the virtual address of any one particular page table entry to yield the page frame number of the physical address of such one particular page table entry.

Pursuant to the invention, when a virtual-to-physical translation is required, the translation buffer initially looks for the virtual page number of the virtual address to be translated. If there is a hit, the corresponding page frame number listed in the translation buffer is provided to the translation mechanism which merges the byte number from the virtual address to the page frame number to yield the physical address. The physical address is then sent to the main memory to fetch the required data.

In the event of a miss, the central processing unit then provides the virtual address of the page table entry for the virtual address to be translated and the translation buffer looks for the virtual page number of the page table entry virtual address. If there is a hit, the translation mechanism will then be able to translate the virtual address into the physical address of the page table entry and fetch the page table entry for the central processing unit. The central processing unit then loads the page frame number of the fetched page table entry into the translation buffer and the translation mechanism will be able to translate the original virtual address.

If there is a second miss, the difficulty of infinite recursion of misses is avoided by having the central processing unit utilize the page table entry prototype of the invention to create the page frame number of the physical address of the page table entry needed to translate the original virtual address, as described above. The translation buffer is then loaded with the page frame number. The translation buffer will than be able to provide the translation mechanism with the information needed to generate the physical address of the page table entry. The translation of the original virtual address can then be completed after the central processing unit receives the page table entry nd loads the translation buffer. Of course, it should be understood that the system can be operated to undergo more or fewer than two levels of recursion before the page table entry prototype is used to create the page frame number of the physical address of the page table entry required to translate the original virtual address.

Thus, the present invention provides a mechanism operable to translate all virtual addresses to physical addresses without ever requiring a direct fetch of a page table entry by the central processing unit. Accordingly, the bypass line and multiplexer are eliminated from the hardware, thereby removing the gate delays of the multiplexer from the timing-critical data path between the main memory- and the central processing unit. Significantly, the elimination of the multiplexer gate delays can result in a direct increase in the speed of operation of the computer system. Indeed, in some instances the amount of increase in the speed of operation is directly proportional to the number of gate delays in the multiplexer divided by the total number of gate delays in the critical path.

For a better understanding of the above and other features and advantages of the present invention, reference should be made to the following detailed description and to the accompanying drawings.

BRIEF DESCRIPTION OF THE DRAWINGS

FIG. 1 is a block diagram of a computer system of the prior art.

FIG. 2 is a block diagram of a computer system having an architecture in accordance with the present invention.

DETAILED DESCRIPTION

Figure 3:
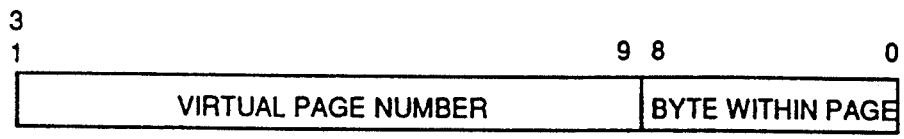
FIG. 3 is a graphic illustration of a virtual address.

Referring now to the drawings and initially to FIG. 1, there is illustrated a computer system arranged in accordance with a heretofore known coupling between a central processing unit 10, a translation mechanism 11 and a main memory module 12. In accordance with a typical implementation of a virtual memory space concept, the data and instructions stored in the memory module 12 at anyone time constitute a certain percentage of the total amount of data and instructions stored in an auxiliary memory device 13 which is coupled to the main memory module 12. The central processing unit 10 makes reference to all data and instructions on the basis of virtual addresses which specify the locations of addressable units within the virtual memory space. As specific data and instructions are needed by application programs being executed by the central processing unit 10, the operating system continuously transfers data from the auxiliary memory device 13 to the main memory module 12 and vice versa over a bus 21. The operating system loads the main memory 12 in accordance with placement algorithms which determine correct locations for the transferred data within the memory module 12 and generates the appropriate physical addresses for locating the data within the main memory device 12.

For the purpose of memory management—specifically, the protection and translation of virtual addresses to physical addresses—the unit of memory is a page. A page comprises a fixed number of addressable units, e.g. 512-bytes Pages are always naturally aligned; that is, the address of the first byte of a page is a multiple of 512. Virtual addresses are 32 bits long, and are partitioned by the memory management logic as shown in FIG. 3.

Referring now to FIG. 3, the bits of the virtual address function, as follows:

Field Extent: Bits 31:9

Field Name: Virtual Page Number (VPN)

Function: The virtual page number field specifies the virtual page to be referenced. There may be, for example, 8,388,608 pages in each virtual address space. Each page contains 512 bytes.

Field Extent: Bits 8:0

Field Name: Byte Number

Function: The byte number field specifies the byte address within the page. As indicated, a page contains 512 bytes.

The nine low-order bits select a byte within a page and are unchanged by the address translation process. The remaining bits are used to obtain the page table entry from the page table.

Figure 8:
FIG. 8 is a graphic illustration of a translation buffer.

In concept, the process of obtaining a page table entry occurs on every memory reference. In practice, the translation mechanism 11 maintains a translation buffer that is a special purpose cache of recently used page table entries. Referring to FIG. 8, the translation buffer maintains a listing of virtual page numbers (VPN) of virtual addresses for data and instructions recently processed by the central processing unit 10. Opposite each virtual page number is the page frame number (PFN) of physical memory where the data identified by the virtual address currently resides in the main memory module 12. Most of the time, the translation buffer already contains the page table entries for the virtual addresses being generated by the program, and the central processing unit 10 need not go to memory to obtain them.

There is one page table entry in the page table for each existing page of the virtual address space. As indicated, the page table is allocated to contiguous space in physical memory and a virtual address is a 32-bit unsigned integer specifying a byte location in the virtual address space. The address space seen by a programmer is a linear array of over 4 billion bytes.

The memory management maps the active part of the virtual address space to the available physical address space. Memory management also provides page protection between processes. The operating system controls the memory management tables that map virtual addresses into main memory addresses. Parts of the virtual address space that are not in use are copied or swapped to auxiliary memory 13. When those parts are needed, they are brought back into the main memory module 12.

Generally, the action of translating a virtual address to a physical address in the prior art system of FIG. 1 is governed by the setting of a Memory Mapping Enable (MME) bit. When MME is reset (0), page protection is disabled and a by-pass line 16 is used to perform a null translation, as will be described below. When MME equals 1, the address translation mechanism 11 is presented with a virtual address, an intended access (read or write), and a mode against which to check that access. If the access is allowed and the address is not faulted, the output of this routine is a physical address corresponding to the specified virtual address.

Figure 4:
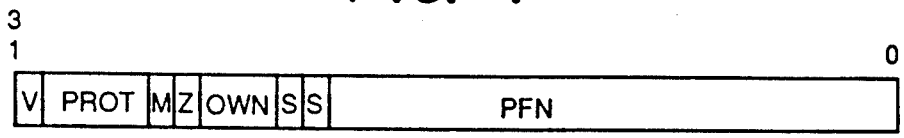
FIG. 4 is a graphic illustration of a page table entry.

Referring now to FIG. 4 there is illustrated a graphic representation of a page table entry. The bits of the page table entry function, as follows:

Field Extent: Bit 31

Field Name: Valid bit (V)

Function: Governs the validity of the modify (M) bit and the page frame number (PFN) field. The bit is set (1) for valid; reset (0) for invalid. When this bit is reset, the modify and page frame number fields are reserved for system software.

Field Extent: Bits 30:27

Field Name: Protection (PROT)

Function This field is always valid and is used by the hardware even when the valid bit is reset (0). The protection field is defined as always being valid and is checked first. The page table entry is defined as having a valid bit that controls the validity of the modify bit and page frame number field only. Protection is checked first so that programs executing in user mode can not perform access protection checks in the system region and fault all the swappable pages.

Field Extent: Bit 26

Field Name: Modify bit (M)

Function: When the valid bit is reset (0), the modify bit is reserved for system software and I/O devices. When the valid bit is set (1) and this bit is reset (0), the page has not been modified. When the valid bit and this bit are set, the page may have been modified. The modify bit is reset by software. It is set by the central processing unit on a successful write or modify to the page. In addition, it may be set by a probe-write instruction or an implied probe-write. This bit is not set if the page is inaccessible.

Field Extent: Bit 25

Field Name: Must be Zero

Function: This bit is reserved and must be zero.

Field Extent: Bits 24:23

Field Name: Owner (OWN) bits

Function: These bits are reserved for system software use. The operating system uses these system bits as the access mode of the owner of the page; that is, the mode allowed to alter the page. The field is not examined or altered by hardware.

Field Extent: Bits 22:0

Field Name: Page Frame Number (PFN)

Function: The upper 23 bits of the physical address of the base of the page. The field is used by hardware only if the valid bit is set.

Referring once again to FIG. 1, the central processing unit 10 generates addresses which are output on bus 14. Bus 14 is coupled to each of a translation mechanism input bus 15 and a translation mechanism by-pass bus 1–6. The physical addresses generated by the translation mechanism 11 are outputted on physical address output bus 17. Each of the translation mechanism by-pass bus 16 and physical address output bus 17 are coupled to an input port of a multiplexer 18. The output port of the multiplexer 18 is coupled to the main memory module 12 by multiplexer output bus 19. Ordinarily, the addresses generated by the central processing unit 10 are virtual addresses which are sent via buses 14 and 15 to the translation mechanism 11 for translation into physical addresses. The physical addresses generated by the translation mechanism 11 are sent via bus 17, multiplexer 18 and bus 19 to the main memory module 12. In this manner, the memory is able to send the required data to the central processing unit 10 via a bus 20.

Figure 5:
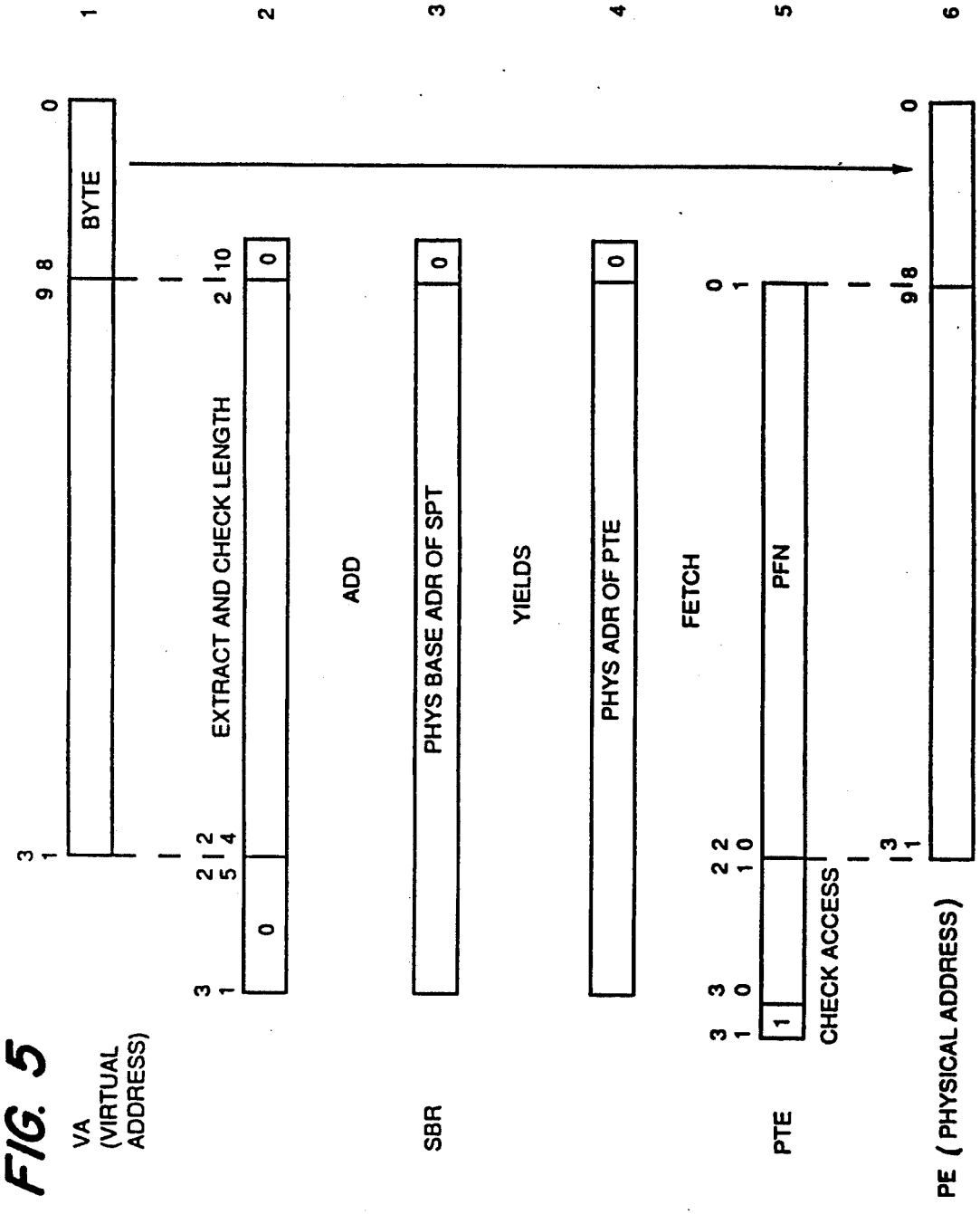
FIG. 5 is a graphic illustration of a virtual-address to physical-address translation as executed by the prior art system of FIG. 1.

Referring now to FIG. 5, the translation mechanism 11 and central processing unit 10 operate to translate virtual addresses to physical addresses in accordance with the diagram illustrated therein. A virtual address generated by the central processing unit 10 is sent over buses 14, 15 to the translation mechanism 11 which looks up the virtual page number of the virtual address to be translated in the translation buffer (see FIG. 8). A translation buffer hit is said to occur when the translation buffer locates the virtual page number in its list and provides the corresponding page frame number to the translation mechanism 11. As illustrated in lines 1 and 6 of FIG. 5, the translation mechanism 11 merges the byte number from the virtual address with the page frame number listed in the translation buffer to provide the physical address.

A translation buffer miss is said to occur when the translation buffer is presented with a virtual page number for which it cannot provide a page frame number. In this event, the central processing unit 10 is signaled accordingly and must fetch the page table entry to load the translation buffer so that the translation mechanism 11 can proceed to complete the translation. As discussed above, the page table is located in contiguous physical address space. The base address of the page table is a physical address which is stored in a base register (BR) in the central processing unit 10. The algorithm to generate a physical address from its virtual address (VA) is:

$$PA = MEM(BR + 4*VA<VPN>)<PFN>'\cdot VA<8:0>$$

Figure 5A:
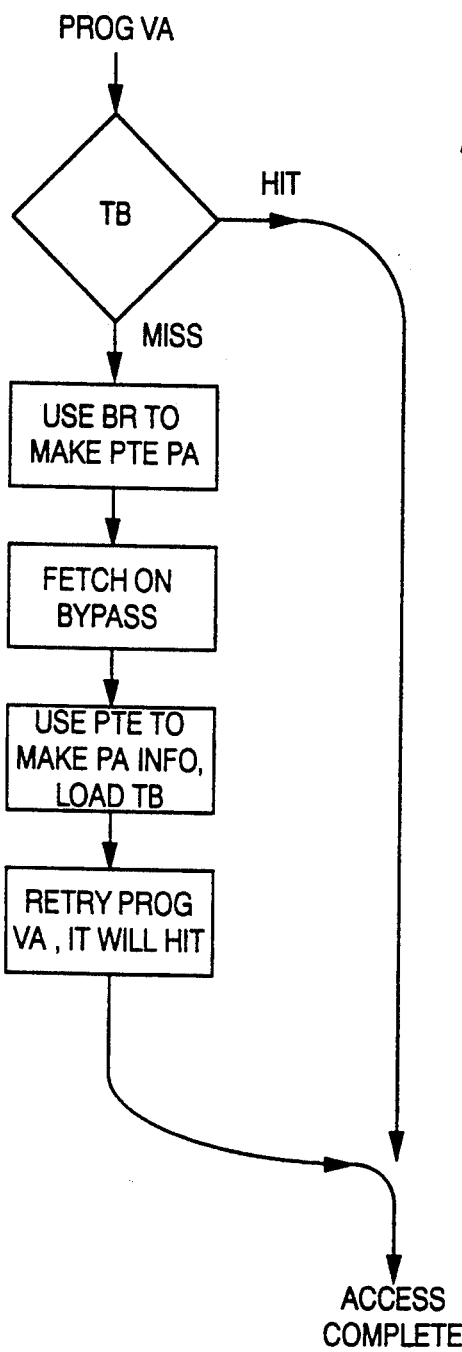
FIG. 5a is a flow chart indicating the sequence of operations by a computer system implementing the virtual-address to physical-address translation illustrated in FIG. 5.

(wherein the apostrophe after <PFN> indicates a concatenation between <PFN> and VA<8:0>). The execution of the algorithm is illustrated in lines 2–6 of FIG. 5. Upon execution of (BR+4*VA <VPN> 'VA<8:0>), the central processing unit 10 sends the physical address of the page table entry over bus 14, by-pass bus 16, through multiplexer 18 and bus 19 to the main memory module 12, to fetch the page table entry located at the physical address determined by the algorithm (line 5, FIG. 5). The central processing unit 10 then loads the translation buffer with the page frame number (PFN) of the fetched page table entry so that the translation mechanism 11 can translate the original virtual address of line 1 of FIG. 5, as described above (lines 1 and 6 of FIG. 5). The various operations of the central processing unit 10, translation mechanism 11 and main memory module 12 are illustrated in the flow chart of FIG. 5a.

A significant drawback of the prior art implementation of the virtual-to-physical address translation is the presence of the multiplexer 18 in the timing-critical data path between the central processing unit 10 and the main memory module 12. In accordance with the present invention, the hardware is implemented without a translation mechanism bypass line and multiplexer. Referring to FIG. 2, the basic components of the system of the invention are the central processing unit 110, the translation mechanism 111, the main memory module 112 and the auxiliary memory 113. However, there is a single bus 150 coupling the central processing unit 110 to the translation mechanism 111 and a single bus 160 coupling the translation mechanism 111 to the main memory module 112. In other words, all addresses generated by the central processing unit 110 are sent to the translation mechanism 111. The system illustrated in FIG. 2 also includes a bus 121 coupling the auxiliary memory 113 to the main memory 112 and a bus 120 for data flow from the main memory 112 to the central processing unit 110.

Pursuant to the invention, the by-pass line and multiplexer are eliminated because the translation mechanism 111 reads the page table using a virtual address. As discussed earlier, an infinite recursion of misses by the translation buffer can occur when only virtual addresses are provided to the translation buffer since the page table resides in physical memory and, at some point, a physical address must be provided to the main memory module 112 to fetch a page table entry in order to load the translation buffer. In accordance with the invention, an infinite recursion of misses is avoided by utilizing a page table entry prototype, contained in a PTEP register in the central processing unit 110, together with the virtual address of the page table entry to create a translation buffer entry for the page table entry without using the page table.

Because the page table is contiguous in each of the physical address space of the main memory module 112 and the virtual address space of the system, an offset can be determined between the physical address of the base of the page table and the virtual address of the base of the page table, which offset is constant throughout the contiguous space of the page table in each of the physical address space and virtual address space. Thus, the page frame number for the prototypical page table entry is made equal to the page frame number of the first page of the page table minus the virtual page number of the first page of the page table.

Figure 7:
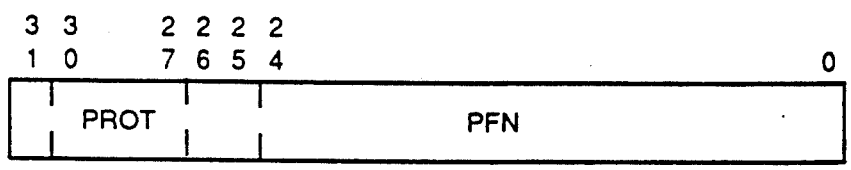
FIG. 7 is a graphic illustration of a page table entry prototype according to the present invention.

Referring to FIG. 7, there is illustrated a format for a page table entry prototype as contained in the PTEP register. The fields of the PTEP register are defined, as follows:

| Extent | Mnemonic | Meaning |
| --- | --- | --- |
| <31> | Reserved | Must be zero. |
| <30:27> | PROT | Protection. |
| <26:23> | Reserved | Must be zero. |
| <22:0> | PFN | Page frame number. The page frame number of the first page of the page table, minus the virtual page number of the first page of the page table. |

The function for translating virtual addresses to physical addresses with the page table in virtual memory and the page table entry prototype (PTEP) may be stated as follows:

$$PTE\_VA = BR + 4*VA<VPN>$$

(The virtual address of the page table entry (PTE) that maps the original virtual address (VA) utilizing the virtual address of the base of the page table in virtual memory contained in the base register (BR).)

PTE_PTE=1'PTEP<PROT>'1'ZEXT(-PTE_VA<VPN>+PTEP<PFN>)

(The page table entry that maps the page of the page table containing PTE_VA.)

PTE_PA=PTE_PTE<PFN>'PTE_VA<8:0>

(The physical address of the page table entry that maps the original virtual address.)

PA=MEM(PTE_PA)<PFN>'VA<8:0>

(The physical address corresponding to the original virtual address.)

Figure 6:
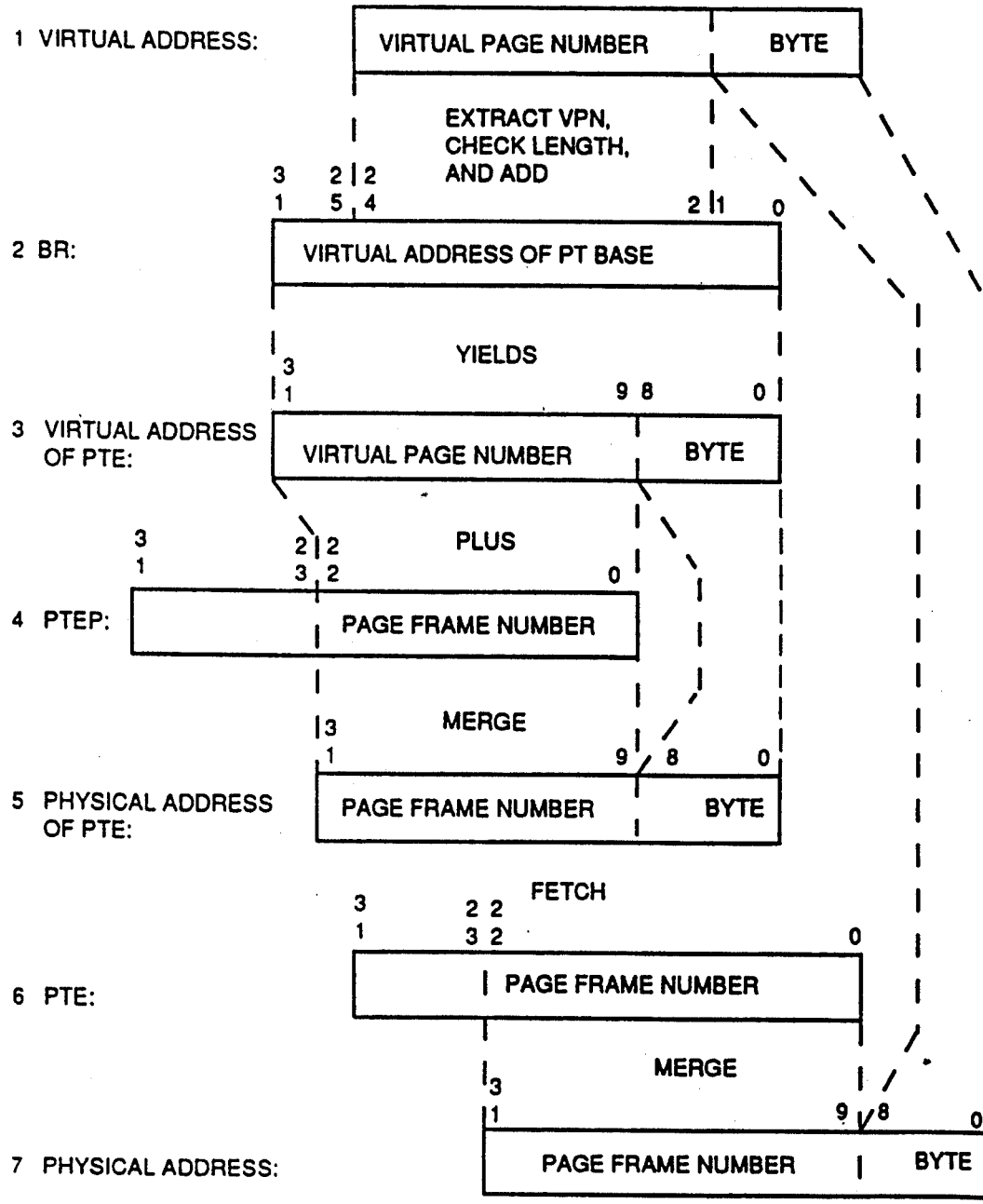
FIG. 6 is a graphic illustration of a virtual address-to-physical address translation in accordance with the present invention.

The above function can be described with respect to the operation of the computer system illustrated in FIG. 2 by referring to FIG. 6. Similar to the prior art system, the virtual address to be translated is sent by the central processing unit 110 over bus 150 to the translation mechanism 111. The translation mechanism 111 undergoes a first order of operation to look up the virtual page number of the virtual address in the translation buffer to ascertain the corresponding page frame number. If there is a hit, the translation mechanism 111 merges the byte number of the virtual address with the page frame number found in the translation buffer to provide the physical address (lines 1, 6 and 7 of FIG. 6). The physical address is then sent over bus 160 to the main memory module 112 to fetch the data.

If there is a first order miss, the central processing unit 110 executes the algorithm PTE_VA=BR+4*VA<VPN> to determine the virtual address of the page table entry that maps the original virtual address (lines 1-3 of FIG. 6) and sends that virtual address to the translation mechanism 111 via bus 150. In the second order of operation of the translation mechanism 111, the translation buffer is utilized to find the page frame number for the virtual address of the page table entry.

In the event of a translation mechanism hit, the translation mechanism 111 merges the byte number of the virtual address of the page table entry with the corresponding page frame number found in the translation buffer to provide the physical address of the page table entry (lines 3 and 5 of FIG. 6). The physical address of the page table entry is then sent over bus 160 to the main memory module 112 to fetch the page table entry needed to load the translation buffer to permit the translation of the original virtual address.

Pursuant to the invention, in the event of a second order miss in the translation buffer, the central processing unit 110 creates the translation buffer entry for the page table entry required for the completion of the translation of the original virtual address through the use of the page table entry prototype and the virtual page number of the virtual address of the page table entry:

PTE_PTE=1'PTEP<PROT>'1'ZEXT(-PTE_VA<VPN>+PTEP<PFN>)

(lines 3-4 of FIG. 6). Thus, by performing the above function, the central processing unit 110 can load the translation buffer with the page frame number of the physical address of the page table entry, thereby enabling the translation mechanism 111 to proceed to translate the virtual address of the page table entry into a corresponding physical address without referring to the page table in physical memory (lines 3 and 5 of FIG. 6) in accordance with the following formulas:

PTE_PA=PTE_PTE<PFN>'PTE_VA<8:0>

Figure 6A:
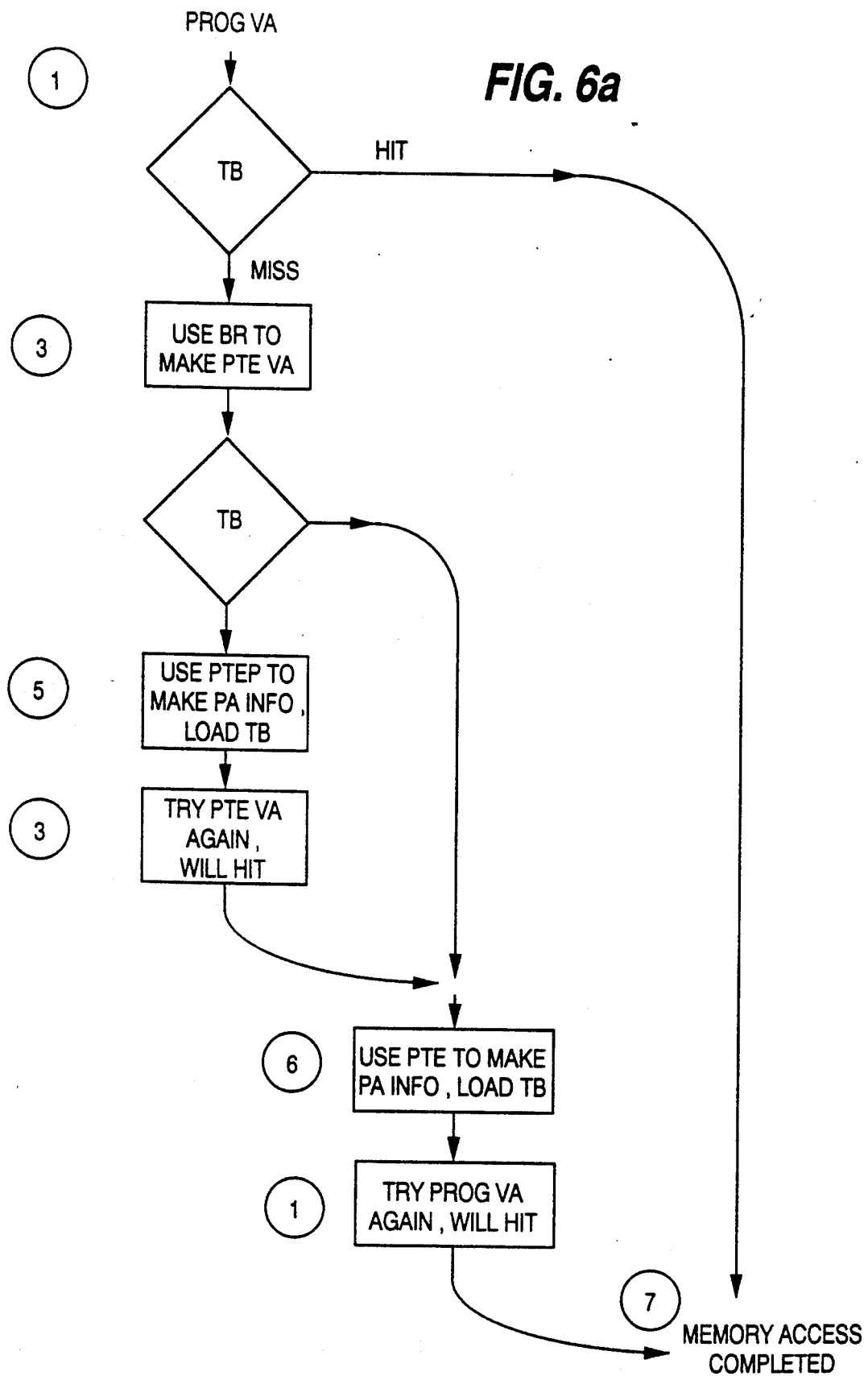
FIG. 6a is a flow chart indicating the sequence of operations by a computer system implementing the virtual-address to physical-address translation illustrated in FIG. 6.

The translation of the original virtual address may now be completed after fetching the page table entry (line 6 of FIG. 6) by once again trying the first order of operation described above. This time there will be a hit inasmuch as the second order of operation provided the required loading of the translation buffer to complete the translation in accordance with PA=MEM(-PTE_PA)<PFN>'VA <8:0> (lines 6 and 7 of FIG. 6). The operation of the central processing unit 110, translation mechanism 111 and main memory module 112 is illustrated in the flow chart of FIG. 6a.

The broad concept of operating a translation mechanism to translate virtual addresses of page table entries without the use of the page table may be implemented even if the page table is not contiguous in the physical address space. This is achieved by providing a page table entry prototype mechanism to contain known cross reference information between the physical addresses for the page table entries of the page table and the corresponding virtual addresses to enable the creation of a page table entry physical address from the virtual address of the page table entry. In the above-described embodiment, arranging the page table to be contiguous in each of the physical address space and virtual address space provides straightforward fixed offset information for the page table entry prototype.

Another feature of the present invention is directed to compatibility of the hardware arrangement of FIG. 2 with existing architectural concepts which permit the by-passing of the memory management function of the translation mechanism through the use of the by-pass line of the prior art arrangement. This is achieved by means of a null mapping function selectively implemented into the translation buffer to simulate a memory management shut-off or by-pass situation. In other words, the translation buffer is provided with a one to one mapping such that the operation of the translation mechanism has no effect upon the address to be translated. Thus, in the event that central processing unit 110 generates an address when MME=0, as for example, during execution of a diagnostic program, the address would be inputted to the translation mechanism 111 over bus 150. The translation mechanism treats the address as usual. A translation buffer hit is treated a described above.

However, in the event of a miss in the translation buffer, the central processing unit creates physical address information such that the physical address page frame number is the same as the virtual address virtual page number. This page frame number is loaded into the translation buffer and there will be a hit when the translation mechanism proceeds.

The present invention provides a highly advantageous virtual-to-physical address translation mechanism by operating the translation mechanism to translate the virtual addresses of page table entries without the use of the page table. In this manner, the translation mechanism by-pass line and multiplexer are eliminated from the critical data path between the central processing unit and main memory. This can result in a directly proportional increase in the speed of operation of the central processing unit in that the gate delays of the multiplexer are removed from the timing-critical data path.

What is claimed is:

1. A computer system, which comprises
   (a) a central processing unit;
   (b) a memory system having a virtual address space containing data referenced by a plurality of virtual addresses and a physical address space containing data referenced by a plurality of physical addresses;
   (c) the data in the physical address space, referenced by the physical addresses, comprising a preselected portion of the data in the virtual address space referenced by the virtual addresses such that the virtual addresses, of the preselected portion of data referenced by virtual addresses, have corresponding physical addresses;
   (d) the physical address space also having a contiguous page table memory space therein, the page table memory space being referenced by physical addresses which locate locations in the page table memory space, each of the locations containing at least a page table entry for a preselected page of the virtual address space;
   (e) a translation mechanism for translating virtual addresses generated by the central processing unit to corresponding physical addresses;
   (f) said translation mechanism being coupled between the central processing unit and the memory system such that the virtual addresses generated by the central processing unit are translated to the corresponding physical addresses, which corresponding physical addresses are transmitted to the physical address space of the memory system to fetch data referenced by the physical addresses;
   (g) said translation mechanism including a translation buffer containing preselected portions of the page table memory space to provide corresponding physical address information to the translation mechanism;
   (h) a base virtual address register containing a base virtual address of a set of contiguous virtual addresses corresponding to the physical addresses used to reference the contiguous page table memory space of the physical address space;
   (i) a page table prototype register containing fixed offset information between a first physical address which locates the base of the contiguous page table memory space in the physical address space, and the base virtual address contained in the base virtual address register;
   (j) means for loading the translation buffer with the preselected portions of the page table memory space;
   (k) the means for loading the translation buffer being coupled to the central processing unit, the base virtual address register and the page table prototype register such that the means for loading the translation buffer:
      (i) adds a portion of a first virtual address generated by the central processing unit to the base virtual address contained in the base virtual address register to yield a second virtual address for a page table memory space location containing the corresponding physical address information for the first virtual address,
      (ii) adds at least a portion of the second virtual address to the offset information contained in the page table prototype register to yield physical address information corresponding to the second virtual address, and
      (iii) loads the translation buffer with at least a portion of the second virtual address and the physical address information corresponding to the second virtual address.

2. The computer system of claim 1 wherein the means for loading the translation buffer operates to simulate a bypass of the translation mechanism by generating null mapping information, the null mapping information including at least a portion of a preselected virtual address and physical address information which is equal to the at least a portion of a preselected virtual address, and loading the null mapping information into the translation buffer in order to cause the translation mechanism to generate a physical address equal to the preselected virtual address when an address equal to the preselected virtual address is applied to the translation mechanism.

3. The computer system of claim 1 wherein
   (a) the virtual address space of the memory system is divided into pages, each of the pages being identified by a virtual page number and each of the pages including a predetermined number of addressable units of data,
   (b) the physical address space of the memory system is divided into page frames, each of the page frames being identified by a page frame number and each of the page frames including a number of addressable units of data equal to the predetermined number of addressable units of data contained in a page of the virtual address space,
   (c) the translation buffer containing the virtual page numbers for the preselected ones of the virtual addresses of the preselected portion of the data referenced by virtual addresses and the page frame numbers corresponding to the next beforementioned virtual page numbers,
   (d) said translation mechanism determining the physical addresses from the virtual addresses and the corresponding page frame numbers contained in the translation buffer.

4. The computer system of claim 3 wherein the page table prototype register contains a page frame number equal to a page frame number relating to the first physical address locating the base of the contiguous page table memory space minus a virtual page number relating to the base virtual address contained in the base virtual address register.

5. A computer system, which comprises
   (a) a central processing unit;
   (b) a memory system having a virtual address space containing data referenced by a plurality of virtual addresses and a physical address space containing data referenced by a plurality of physical addresses;
   (c) the data in the physical address space, referenced by the physical addresses, comprising a preselected portion of the data in the virtual address space referenced by the virtual addresses such that the virtual addresses, of the preselected portion of data referenced by virtual addresses, have corresponding physical addresses;
   (d) the physical address space also having a page table memory space therein, the page table memory space being referenced by physical addresses which locate locations in the page table memory space, each of the locations containing at least a page table entry for a preselected page of the virtual address space;

(e) a translation mechanism for translating virtual addresses generated by the central processing unit to corresponding physical addresses;

(f) said translation mechanism being coupled between the central processing unit and the memory system such that the virtual addresses generated by the central processing unit are translated to the corresponding physical addresses, which corresponding physical addresses are transmitted to the physical address space of the memory system to fetch data referenced by the physical addresses;

(g) said translation mechanism including a translation buffer containing information identical to preselected portions of the page table memory space in order to provide corresponding physical address information to the translation mechanism;

(h) the page table memory space further referenced by a set of virtual addresses, which correspond to the physical addresses, for referencing the page table memory space;

(i) the translation buffer further including at least certain ones of the set of virtual addresses and the corresponding physical address to provide the translation mechanism with information to translate the at least certain ones of the virtual addresses to the corresponding physical addresses, for referencing the page table memory space; and (j) means for loading the translation buffer with the information identical to preselected portions of the page table memory space, said means coupled to the central processing unit and including a page table entry prototype mechanism such that said means for loading the translation buffer operates:

(i) to add, in the page table prototype mechanism, a proton of a first virtual address generated by the central processing unit to a base virtual address of the set of virtual addresses corresponding to the physical addresses used to reference the page table memory space of the physical address space to yield a second virtual address for a page table memory space location containing the corresponding physical address information for the first virtual address, (ii) to input the second virtual address into the page table prototype mechanism, which page table prototype mechanism contains known cross reference information between each virtual address of the set of virtual addresses and the corresponding physical address for referencing the page table memory space, and which page table entry prototype mechanism operates to generate physical address information corresponding to the second virtual address, and (iii) to load the translation buffer with at least a portion of the second virtual address and the physical address information corresponding to the second virtual address.

6. A computer system, which comprises:

(a) a central processing unit;

(b) a memory system having a virtual address space containing data referenced by a plurality of virtual addresses and a physical address space containing data referenced by a plurality of physical addresses;

(c) certain ones of the virtual addresses each having a corresponding physical address;

(d) the physical address space having a page table memory space therein; the page table memory space being referenced by physical addresses which locate locations in the page table memory space, each of the locations containing at least a page table entry for a certain page of the virtual address space;

(e) a translation mechanism for translating virtual addresses generated by the central processing unit to corresponding physical addresses;

(f) said translation mechanism being coupled between the central processing unit and the memory system such that the virtual addresses generated by the central processing unit are translated to the corresponding physical addresses, which corresponding physical addresses are transmitted to the physical address space of the memory system to fetch data referenced by the physical addresses;

(g) said translation mechanism including a translation buffer containing preselected portions of the page table memory space to provide corresponding physical address information to the translation mechanism;

(h) the page table memory space further referenced by a set of virtual addresses which correspond to the physical addresses for referencing the page table memory space;

(i) a page table prototype mechanism including known cross reference information between the set of virtual addresses and the corresponding physical addresses for referencing the page table memory space, the known cross-reference information comprising offset information between all virtual addresses and their corresponding physical addresses;

(j) said page table prototype mechanism operating to determine physical address information for referencing the page table memory space from a corresponding one of the set of virtual addresses and the known cross reference information contained in the page table prototype mechanism.

7. The computer system of claim 6, wherein:

(a) the page table memory space occupies contiguous locations in both the physical address space and the virtual address space; and (b) the offset information comprising fixed offset information.

8. A method for loading a translation buffer of a computer system, which computer system includes a virtual memory space having data referenced by a plurality of virtual addresses and a physical memory space having data referenced by a plurality of physical addresses; certain ones of the virtual addresses having a corresponding physical address, the translation buffer being loaded with virtual address information and corresponding physical address information, the method comprising the steps of:

(a) providing a contiguous page table memory space in the physical memory space, the page table memory space being referenced by physical addresses, which physical addresses each locate locations containing at least a page table entry for a preselected page of the virtual memory space, the page table entry indicating the physical address of the preselected page of the virtual memory space;

(b) providing a base virtual address register containing a base virtual address of a set of contiguous virtual addresses corresponding to the physical addresses used to reference the contiguous page table memory space of the physical address space;

(c) providing a page table entry prototype register containing fixed offset information between a first physical address locating the base of the contiguous page table memory space in the physical address space and the base virtual address contained in the base virtual address register; and (d) operating the computer system to load the translation buffer by
  (i) adds a portion of a preselected on virtual address to the base virtual address contained in the base virtual address register to yield a second virtual address for a page table memory space location containing the corresponding physical address information for the preselected one virtual address;
  (ii) adding at least a portion of the second virtual address to the offset information contained in the page table entry prototype register to yield physical address information corresponding to the second virtual address; and
  (iii) loading the translation buffer with the at least a portion of the second virtual address and the physical address information corresponding to the second virtual address.

9. A computer system, which comprises
(a) a central processing unit;
(b) a memory system having a virtual address space containing data referenced by a plurality of virtual addresses and a physical address space containing data referenced by a plurality of physical addresses;
(c) the data in the physical address space, referenced by the physical addresses, comprising a preselected portion of the data in the virtual address space referenced by the virtual addresses such that the virtual addresses, of the preselected portion of data referenced by virtual addresses, have corresponding physical addresses;
(d) the physical address space also having a contiguous page table memory space therein, the page table memory space being referenced by physical addresses which locate locations in the page table memory space, each of the locations containing at least a page table entry for a preselected page of the virtual address space;
(e) a translation mechanism for translating virtual addresses generated by the central processing unit to corresponding physical addresses;
(f) said translation mechanism being coupled between the central processing unit and the memory system such that the virtual addresses generated by the central processing unit are translated to the corresponding physical addresses, which corresponding physical addresses are transmitted to the physical address space of the memory system to fetch data referenced by the physical addresses;
(g) said translation mechanism including a translation buffer containing preselected portions of the page table memory space to provide corresponding physical address information to the translation mechanism;
(h) a base virtual address register containing a base virtual address of a set of contiguous virtual addresses corresponding to the physical addresses used to reference the contiguous page table memory space of the physical address space;
(i) a page table prototype register containing fixed offset information between a first physical address which locates the base of the contiguous page table memory space in the physical address space, and the base virtual address contained in the base virtual address register;
(j) the central processing unit including means for loading the translation buffer with the preselected portions of the page table memory space;
(k) the means for loading the translation buffer being coupled to the base virtual address register and the page table prototype register such that the means for loading the translation buffer:
  (i) adds a portion of a first virtual address generated by the central processing unit to the base virtual address contained in the base virtual address register to yield a second virtual address for a page table memory space location containing the corresponding physical address information for the first virtual address,
  (ii) adds at least a portion of the second virtual address to the offset information contained in the page table prototype register to yield physical address information corresponding to the second virtual address, and
  (iii) loads the translation buffer with at least a portion of the second virtual address and the physical address information corresponding to the second virtual address.

10. A computer system, which comprises
(a) a central processing unit;
(b) a memory system having a virtual address space containing data referenced by a plurality of virtual addresses and a physical address space containing data referenced by a plurality of physical addresses;
(c) the data in the physical address space, referenced by the physical addresses, comprising a preselected portion of the data in the virtual address space referenced by the virtual addresses such that the virtual addresses, of the preselected portion of data referenced by virtual addresses, have corresponding physical addresses;
(d) the physical address space also having a page table memory space therein, the page table memory space being referenced by physical addresses which locate locations in the page table memory space, each of the locations containing at least a page table entry for a preselected page of the virtual address space;
(e) a translation mechanism for translating virtual addresses generated by the central processing unit to corresponding physical addresses;
(f) said translation mechanism being coupled between the central processing unit and the memory system such that the virtual addresses generated by the central processing unit are translated to the corresponding physical addresses, which corresponding physical addresses are transmitted to the physical address space of the memory system to fetch data referenced by the physical addresses;
(g) said translation mechanism including a translation buffer containing information identical to preselected portions of the page table memory space in order to provide corresponding physical address information to the translation mechanism;

(h) a page table memory space further referenced by a set of virtual addresses, which correspond to the physical addresses, for referencing the page table memory space;

(i) the translation buffer further including at least certain ones of the set of virtual addresses and the corresponding physical addresses to provide the translation mechanism with information to translate the at least certain ones of the virtual addresses to the corresponding physical addresses, for referencing the page table memory space; and (j) the central processing unit including means for loading the translation buffer with the information identical to preselected portions of the page table memory space, said means including a page table entry prototype mechanism such that said means for loading the translation buffer operates:

(i) to add, in the page table prototype mechanism, a portion of a first virtual address generated by the central processing unit to a base virtual address of the set of virtual addresses corresponding to the physical addresses used to reference the page table memory space of the physical address space to yield a second virtual address for a page table memory space location containing the corresponding physical address information for the first virtual address, (ii) to input the second virtual address into the page table prototype mechanism, which page table prototype mechanism contains known cross reference information between each virtual address of the set of virtual addresses and the corresponding physical address for referencing the page table memory space, and which page table entry prototype mechanism operates to generate physical address information corresponding to the second virtual address, and (iii) to load the translation buffer with at least a portion of the second virtual address and the physical address information corresponding to the second virtual address.

11. A method for retrieving data from a memory of a computer system without requiring a central processing unit to directly access a page table memory space physically located in the memory, which computer system includes a virtual memory space having data referenced by a plurality of virtual addresses, the memory comprising a physical memory space having data referenced by a plurality of physical addresses, certain ones of the virtual addresses each having a corresponding physical address, and a translation buffer loaded with virtual address information and corresponding physical address information, the method comprising the steps of:

(a) providing a page table memory space in the physical memory space, the page table memory space being referenced by physical addresses, which physical addresses each locate locations containing at least a page table entry for a preselected page of the virtual memory space, the page table entry indicating the physical address of the preselected page of the virtual memory;

(b) providing a base virtual address of a set of virtual addresses corresponding to the physical addresses used to reference the page table memory space of the physical address space;

(c) providing fixed offset information between a first physical address locating the base of the page table memory space in the physical address space and the base virtual address; and (d) operating the computer system to retrieve data from the memory by (i) generating a first virtual address, (ii) utilizing the first virtual address to determine whether the translation buffer contains corresponding physical address information for the first virtual address, (iii) using the corresponding physical address information obtained from the translation buffer to retrieve data referenced by the first virtual address when the translation buffer contains the corresponding physical address information for the first virtual address, (iv) adding a portion of the first virtual address to the base virtual address to yield a second virtual address for a page table entry containing corresponding physical address information for the first virtual address when the translation buffer does not contain the corresponding physical address information for the first virtual address, (v) using the second virtual address to determine whether translation buffer contains corresponding physical address information for the second virtual address, (vi) using the corresponding physical address information to retrieve the page table entry referenced by the second virtual address when the translation buffer contains the corresponding physical address information for the second virtual address, (vii) loading the page table entry into the translation buffer after the page table entry of the second virtual address has been retrieved, (viii) repeating steps (ii) and (iii) after loading step (vii) has been performed, (ix) adding at least a portion of the second virtual address to the offset information to determine physical address information corresponding to the second virtual address when the translation buffer does not contain the corresponding physical address information for the second virtual address, (x) loading the translation buffer with the at least a portion of the second virtual address and the physical address information determined in step (ix), (xi) repeating steps (v) through (vii) after the loading step (x) has been performed.

* * * * *